(12) United States Patent
Stevens (10) Patent No.: US 11,774,314 B2
(45) Date of Patent: Oct. 3, 2023

(54) METHOD FOR THE INDIRECT EVALUATION OF PRE-CHARGE AIR PRESSURE IN A DIAPHRAGM-TYPE OR BLADDER-TYPE EXPANSION TANK

(71) Applicant: HYDRONICS LLC, Erie, CO (US)

(72) Inventor: Lee Hiram Stevens, Erie, CO (US)

( * ) Notice: Subject to any disclaimer, the term of this patent is extended or adjusted under 35 U.S.C. 154(b) by 0 days.

(21) Appl. No.: 18/016,795

(22) PCT Filed: Sep. 13, 2021

(86) PCT No.: PCT/US2021/050010
§ 371 (c)(1),
(2) Date: Jan. 18, 2023

(87) PCT Pub. No.: WO2022/060653
PCT Pub. Date: Mar. 24, 2022

(65) Prior Publication Data
US 2023/0194381 A1     Jun. 22, 2023

Related U.S. Application Data

(60) Provisional application No. 63/078,530, filed on Sep. 15, 2020.

(51) Int. Cl.
*G01M 3/32* (2006.01)
*F24D 3/10* (2006.01)

(52) U.S. Cl.
CPC ......... *G01M 3/3218* (2013.01); *F24D 3/1008* (2013.01); *G01M 3/3272* (2013.01)

(58) Field of Classification Search
CPC .... G01M 3/3218; G01M 3/3272; G01M 3/36; G01M 3/329; G01M 3/3263; G01M 3/3236; G01M 3/04; G01M 3/3281; G01M 3/146; F24D 3/1008; F24D 3/1016; F24D 3/10; F24D 3/1083; F24D 3/04; F24H 15/242
See application file for complete search history.

(56) References Cited

U.S. PATENT DOCUMENTS

| | | |
|---|---|---|
| 5,344,071 A | 9/1994 | Peifer |
| 8,919,112 B1 | 12/2014 | Fong et al. |
| 2013/0240178 A1 | 9/2013 | Chandler |
| 2017/0268159 A1 | 9/2017 | Brown |
| 2018/0340854 A1 | 11/2018 | Stevens |
| 2019/0293302 A1 | 9/2019 | Van et al. |

*Primary Examiner* — John Fitzgerald
*Assistant Examiner* — Truong D Phan
(74) *Attorney, Agent, or Firm* — Leyendecker & Lemire LLC (57) ABSTRACT

Setting and maintaining proper pre-charge air pressure in a diaphragm or bladder-type expansion tank of any fluid system is essential for safe and efficient operation of that system. In usual practice, pre-charge air pressure checks are done by emptying the system of fluid and connecting an analog air gauge to the air input of the expansion tank. In this invention a pressure sensor that is permanently coupled to the fluid volume of the expansion tank is used to also evaluate the pre-charge air pressure in the tank. By employing a single sensor for both fluid and pre-charge air pressure evaluation, the problem of inconsistent calibration between fluid sensing and air pre-charge measuring devices is eliminated. Using the same permanently installed sensor for every test or adjustment in a given system eliminates the problem of variations in calibration between different sensors or gauges used at different testing times.

15 Claims, 9 Drawing Sheets

METHOD FOR THE INDIRECT EVALUATION OF PRE-CHARGE AIR PRESSURE IN A DIAPHRAGM-TYPE OR BLADDER-TYPE EXPANSION TANK

RELATED APPLICATIONS

This application claims the benefit of and hereby incorporates by reference a U.S. Provisional Patent Application having the same inventors as the present application: namely, application No. 63/078,530 filed on Sep. 15, 2020 and having the title "Method for the Indirect Evaluation of Pre-charge Air Pressure in a Diaphragm-Type or Bladder-Type Expansion Tank".

BACKGROUND

Closed loop fluid heat transfer systems must have a means of modulating the fluid volume in response to thermal expansion and contraction of the contained fluid. A common type of such system is a hydronic space heating and or cooling system. These systems are typically comprised of a thermal source, such as a boiler or heat pump, one or more emitters, such as baseboard radiators or in-floor radiant tubing, and a means of circulating the contained fluid, such as by one or more pumps, between the source and emitters. Typically, these systems use a diaphragm or bladder type of expansion tank, as a means of modulating the fluid volume and thereby limiting the pressure changes in the system. These tanks are characterized by a non-porous flexible membrane that separates the fluid side of the tank from the captive air volume in the tank. The fluid volume may increase or decrease in response to average temperature of the total fluid volume, and the associated thermal expansion or contraction of the fluid volume. The pre-charge air pressure, which is the amount of air pressure pre-applied to the air chamber, determines the initial pressure that may be exerted on the fluid, and thus through the total range of volume change. The membrane moves and or stretches to accommodate the incompressible fluid volume, and the fluid system pressure rises or falls as the pressure of the captive air mass is altered as the air volume is reduced or expanded.

It is common practice to set up these systems with the fluid, and the air charge in the expansion tank, at or below the normal operating or ambient temperature. If the fluid is subsequently cooled sufficiently to contract to a volume that is insufficient to have any fluid remaining in the tank, there may be a serious problem with system operation. At the point where the last fluid contracts out of the tank, the diaphragm or bladder is now pushing against the wall of the tank itself, bridging over the fluid port of the tank, and can exert no pressure on the fluid volume. The fluid pressure will fall precipitously at this instant, from that of the pre-charge air pressure to whatever the static head pressure of the fluid system may be. This fluid static pressure by itself may not be sufficient to prevent cavitation at the impeller of a circulator pump, leading to pump burnout and system failure.

In hydronic heating systems, it is common practice to receive an expansion tank from the manufacturer pre-charged at a known pressure, typically 12 pounds per square inch. Typically the installer will set up the system with an automatic feed valve, which is then set for a minimum operating fluid pressure greater than the stated pre-charge pressure. For many systems, this simplistic approach to system setup is workable. As more precise means of monitoring and maintaining fluid volume, and hence pressure, come into use, a new set of issues emerges. Any expansion tank has an acceptance volume, which is the maximum fluid volume that can expand into the tank without opening any pressure relief valve installed on the fluid system. The lower the air pre-charge pressure is below a desired minimum operating pressure and an automatic feed valve set point, the greater the volume of fluid that must be in the tank before the air volume can be compressed enough to exert sufficient pressure on the fluid to raise fluid pressure to the required working value. This has the effect of reducing the volume available to accommodate subsequent fluid thermal expansion.

A second issue is if the pre-charge pressure is above the desired system minimum operating pressure, there will be no fluid volume margin for any thermal contraction, or for fluid loss in operation. With no fluid volume in the tank to make up for contraction, the pressure value in the fluid system is highly unstable and often not even measurable. One outcome is a bounce in the operation of the automatic fill valve, with uncertain results. This is exacerbated by the behavior of the bladder or diaphragm, which unlike a rigid piston may trap pockets of fluid as it nears total fluid evacuation, only to see those pockets slowly pushed towards the fluid port, and thereby affecting the instantaneous pressure reading in the fluid over the short term.

The optimum condition for an expansion tank is to determine the desired minimum system fluid operating pressure, and then set the air pre-charge pressure slightly below that value, during a cold fill set up procedure. This insures proper system pressure at all times, insures that the system pressure will be correctly measurable, and maximizes the available acceptance volume of the expansion tank while in use. Typically, this results in the fluid pressure and the pre-charge pressure being determined or set by different measuring gauges or devices. The practical difficulty is that the calibration and accuracy of the gauges used by most installers may vary significantly, such that an observed pressure difference may actually be inaccurate or misleading. A further cause for problems is that the typical expansion tanks are small, and the act of manually testing the pre-charge air pressure can release enough air to measurably alter the pre-charge pressure.

Expansion tanks are subject to degradation and possible total collapse of pre-charge pressure over time. This may be caused by fluid leakage into the air compartment, air leakage to the exterior, and also by oxygen diffusion through the membrane, into the fluid. A proper and accurate assessment of pre-charge pressure should ideally invoke the same pressure-measuring device, at any point in time. This will be unlikely, given the present nature of the service industry.

Sensor based fluid pressure monitoring and control systems are now available for closed loop heat transfer systems. These rely on a pressure sensor, or transducer, that is permanently coupled to the fluid volume. As the precision of the system fluid control is enhanced, it becomes more critical to precisely measure and set the air pre-charge pressure. It is not practical or economical to permanently install a separate pressure sensor coupled to the air compartment of the expansion tank. The issue becomes one of how to properly set the pre-charge pressure. It would be very beneficial to have the same sensor, with unvarying calibration, be used to measure the pre-charge air pressure and measure the fluid pressure. Physically moving the sensor would disrupt the volumes and pressures being measured, so another approach is needed.

Figure 1:
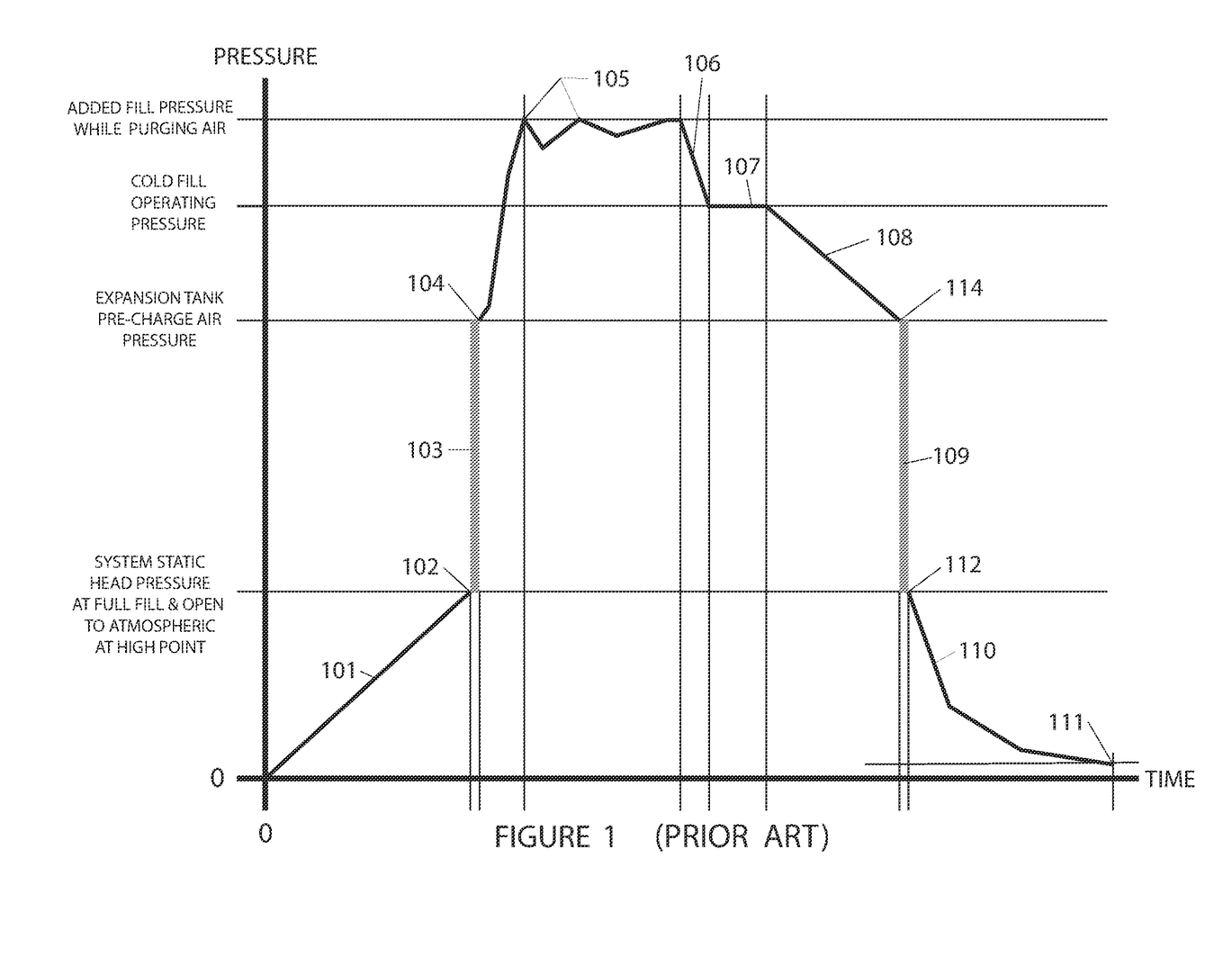
FIG. 1 is a graph of fluid pressure vs. time measured at the expansion tank of a system as it is filled from empty, purged of air, then the operating pressure is adjusted, and then the system is drained down

FIG. 1 illustrates the graph of fluid pressure over time, as an entire system is initially filled, purged, adjusted for fluid operating pressure, and then drained down. The pressure measurement is taken in close proximity to the expansion tank, and presumes some vertical displacement up to the highest point in the system fluid piping and equipment. At the commencement of the fill operation, fluid pressure will increase relatively slowly and linearly (101), as the system piping is filled. At the point (102) that the system is fully filled and with any purge valves at the top of the system opened, the pressure value measured will be governed by the height of the fluid column above the transducer.

If any purge or drain valves are now closed, while continuing to add fluid, the diaphragm of the tank will be immediately pushed away from the tank wall, and the pre-charge air pressure in the tank, acting across the diaphragm, will be supporting the incompressible fluid and thereby controlling the system fluid pressure value. A near instantaneous pressure increase (103) will be observed, up to the value of the air pre-charge pressure (104). It is not possible to maintain a stable fluid pressure value in the range between the static head pressure (102) and the air pre-charge pressure (104), although rapid transient pressure values may be observed. Typically, purge valves are now opened slowly (105) along with a boosted fluid supply pressure, to push trapped air from the system. The final step is to drain down fluid (106) to bring the fluid pressure down to the desired initial cold fill operating pressure (107).

If the system drain valve is then held open, fluid pressure will fall (108) as fluid is first pushed out of only the expansion tank due to air pre-charge pressure, and at the air pre-charge pressure value (114), the tank will be completely evacuated of fluid. From this pressure value, fluid pressure will fall precipitously (109) to the value due to static head pressure of the fluid column (112). Again, in this region (109) only rapid pressure transients may be observed. A further very slow drop in pressure (110) will be exhibited as the system continues to drain, typically relaxing to some residual static pressure value (111) because of incomplete draining due to vacuum lock and capillary action.

While the specifications herein generally describe closed loop heat transfer systems, and focus more specifically on hydronic space heating and or cooling systems, the method of this invention may be applicable to the indirect evaluation of pre-charge air pressure in any diaphragm or bladder type of expansion tank by means of a pressure sensor coupled to the fluid side of the diaphragm or bladder.

BRIEF SUMMARY OF THE DRAWINGS

FIGS. 9A and 9B are schematics of an expansion tank fluidly coupled to a pressure transducer and with an arrangement of valves to enable an air pre-charge pressure test, and including an installed means of directly measuring pre-charge air pressure.

DESCRIPTION OF THE INVENTION

Overview

This invention describes a method of operation for evaluating and setting the pre-charge air pressure in an expansion tank using the same installed pressure measurement device, and therefore calibration values, as is used to measure fluid pressure during system operation.

Figure 2:
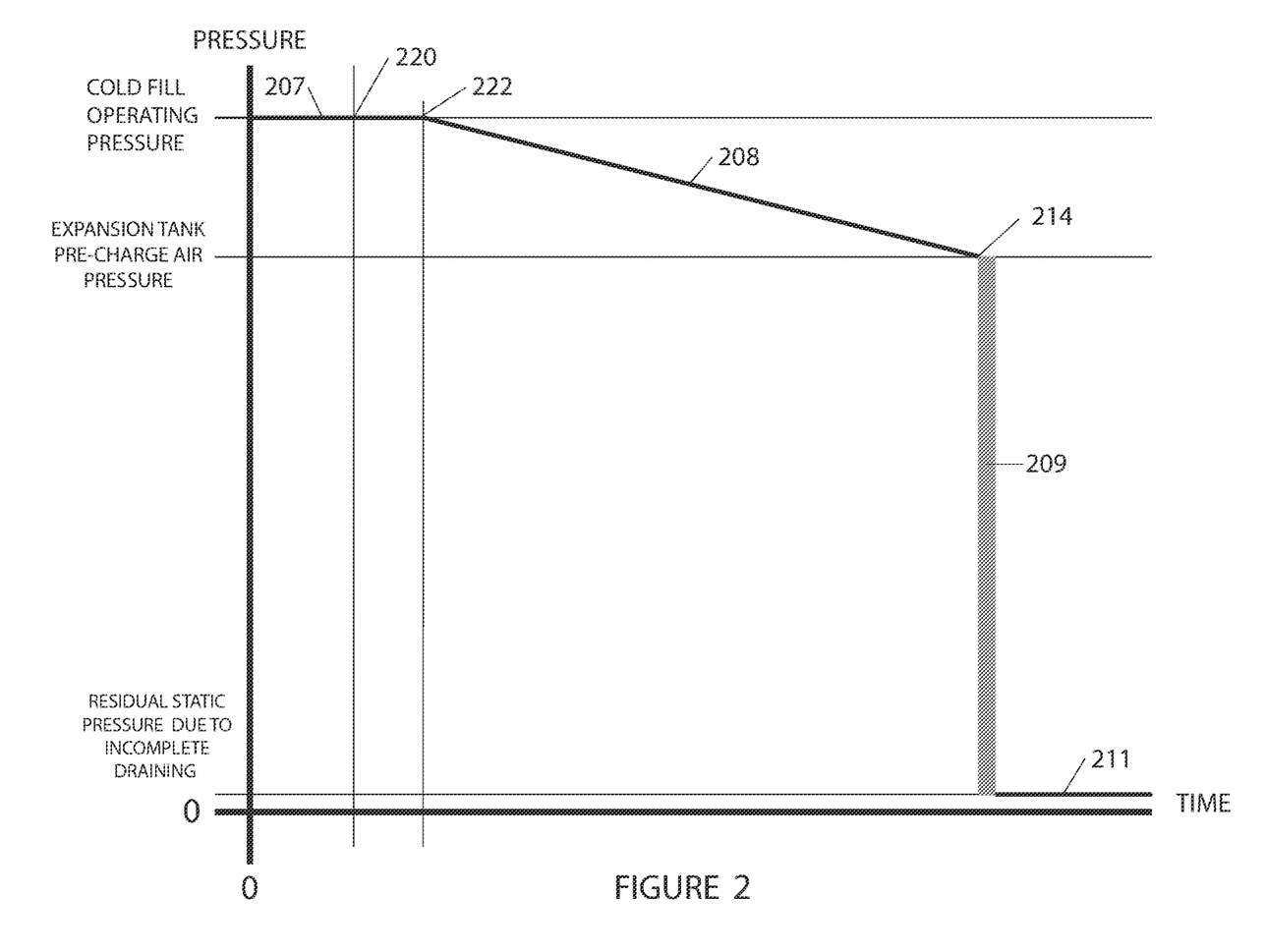
FIG. 2 is a graph of fluid pressure vs. time measured at an expansion tank that has been isolated from the system, and then drained down

FIG. 2 illustrates the graph of fluid pressure over time for an expansion tank that is fluidly isolated (220) from the system 650 while at cold fill fluid pressure (207). A drain valve is then opened (222) to release the contained fluid (208). This is similar to the right hand portion of the graph of FIG. 1. By isolating the tank 600 from the system 650, the fluid pressure falls to the air pre-charge pressure value (214) when the fluid is fully pushed out of the tank proper and the diaphragm is fully collapsed against the tank wall. There is then an immediate and precipitous pressure drop (209) all the way down to a residual value (211), due to incomplete draining of the piping connection.

As previously recited, only rapid transient pressure values may be observable in this region (209) between the air pre-charge pressure value (214) and the residual pressure value (211). System static head pressure is not a factor and the need to, and or effect of, draining the entire system is now made irrelevant to the pressure measurement at the tank. The fluid volume represented by this tank-only drain down process will be very small relative to total system volume. It is only while the tank is isolated and fully drained of fluid that the air pre-charge pressure may be directly measured with absolute reliability and precision.

The laws of fluid dynamics come into play in attempting pressure measurements in the fluid of systems as described above. If there is any fluid flow past the port of a transducer used for the pressure measurement, the static pressure as sensed will be reduced by the velocity component of the fluid pressure. The higher the velocity of the flow, the greater is the reduction in measured static pressure, which is what the sensor reports.

Figure 3:
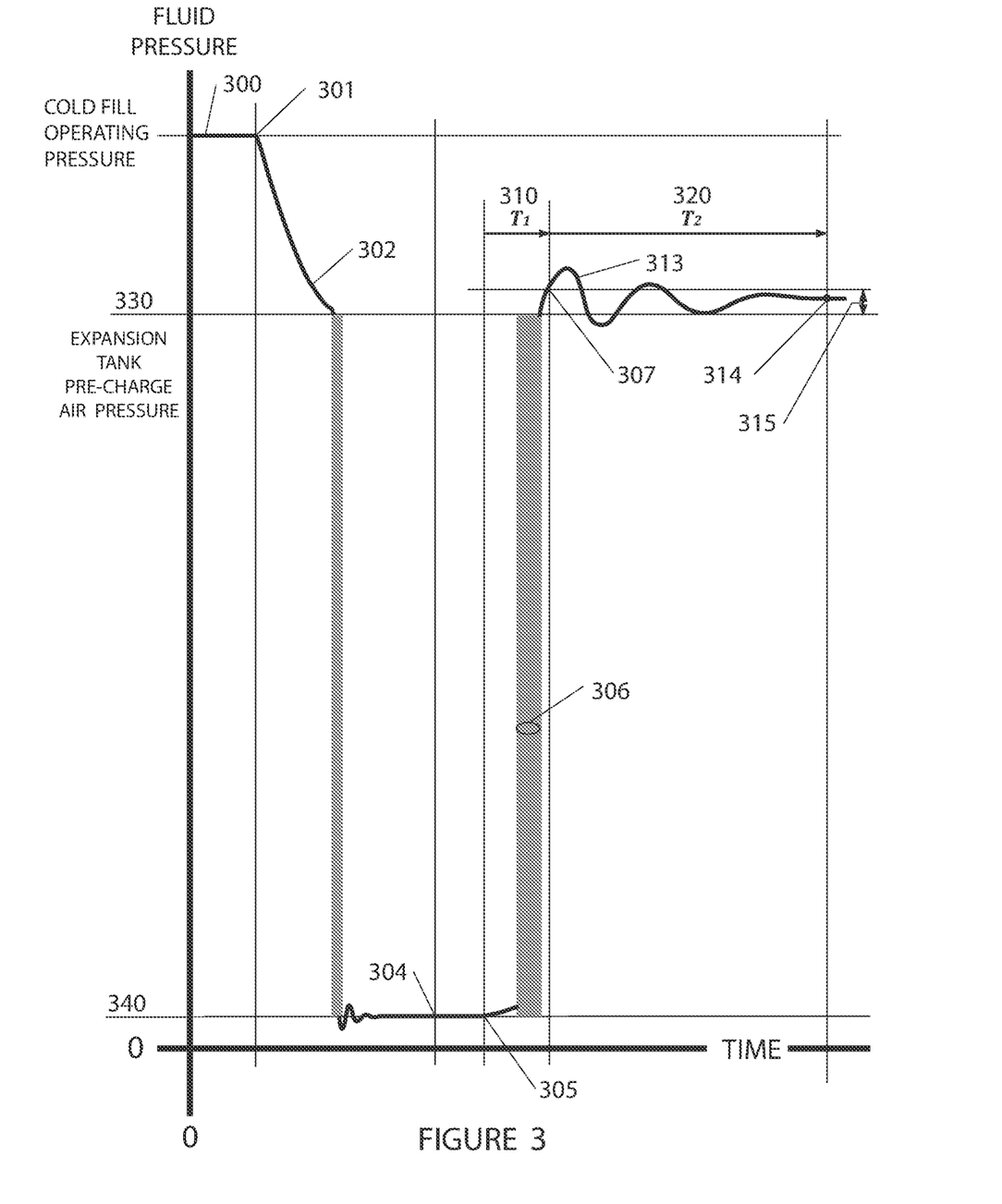
FIG. 3 is a graph of fluid pressure vs. time for an expansion tank that starts at fluid operating pressure, is isolated from the system, drained down and then a pre-determined volume of fluid is introduced, per a first embodiment of this invention

A first embodiment of a method of operation for pre-charge air pressure evaluation in an expansion tank commences with some unknown fluid volume contained within, and a means of observing and recording pressure values in the fluid coupled to the tank. A graph of fluid pressure vs. time for this embodiment is illustrated in FIG. 3. In this embodiment, an expansion tank is isolated from the system, the contained fluid is drained to the atmosphere down to a residual fluid pressure, the drain valve is closed, and a controlled small volume of fluid is introduced. The additional fluid volume may be controlled by a fluid flow-metering device, or by filling for a pre-determined period of time. At a pre-determined period of time after the fluid supply valve is closed, the fluid pressure value is reported and utilized to evaluate the original pre-charge air pressure.

Figure 4:
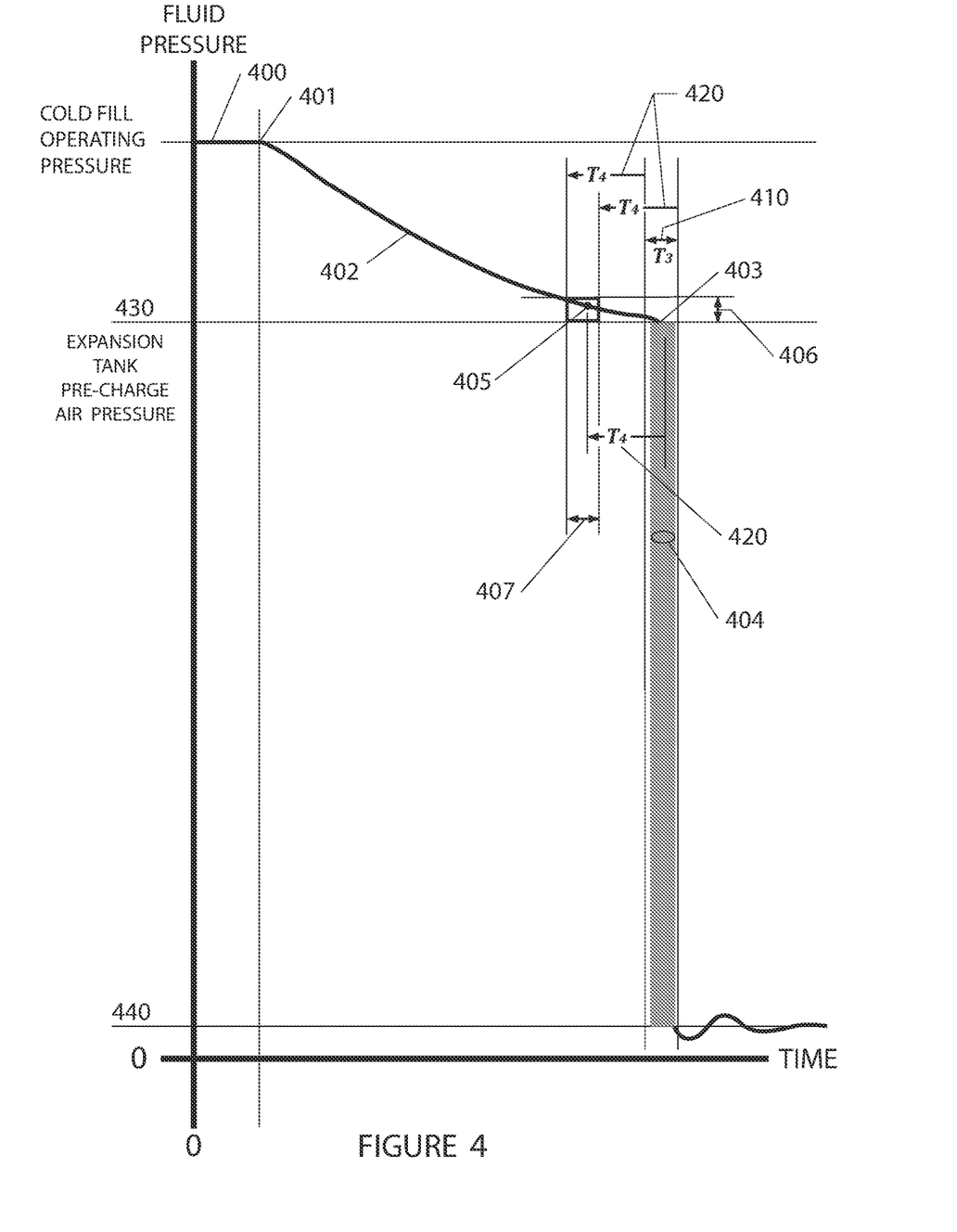
FIG. 4 is a graph of fluid pressure vs. time for an expansion tank that starts at operating pressure, and is then isolated from the system and drained down, per a second embodiment of this invention

A second embodiment of a method of operation for pre-charge air pressure evaluation in an expansion tank commences with some unknown fluid volume contained within, and a means of continuously observing and recording pressure values in the fluid coupled to the tank. A graph of fluid pressure vs. time for this embodiment is illustrated in FIG. 4. In this embodiment, an expansion tank is isolated from the system and fluid pressure values are recorded as the fluid is drained to the atmosphere. As the last of the fluid is evacuated from the tank proper, the pressure inflection point is identified with an associated recorded time. At a pre-determined period of time prior to the time of the identified inflection point, the associated prior recorded fluid pressure value is reported and utilized to evaluate the original pre-charge air pressure.

Figure 5:
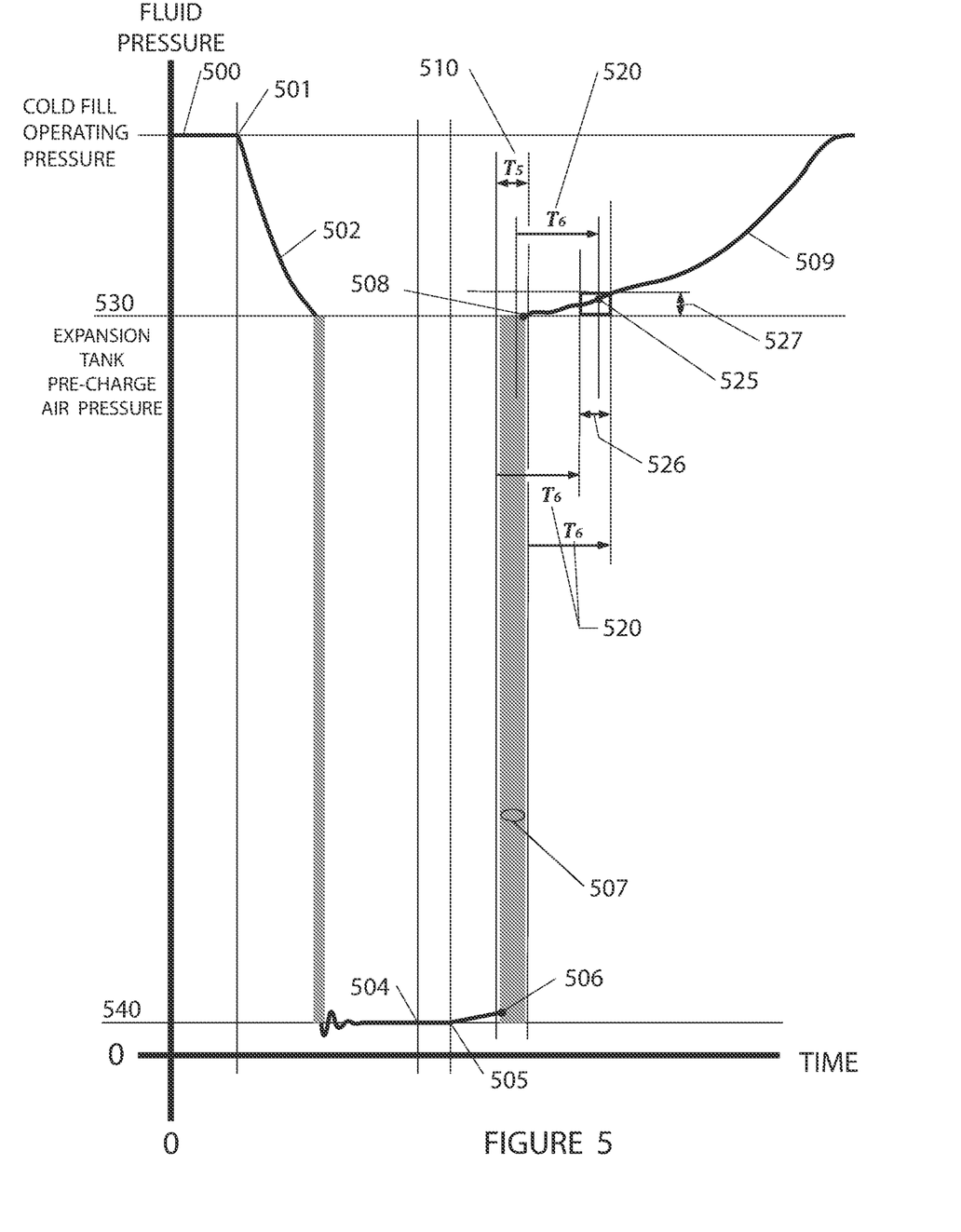
FIG. 5 is a graph of fluid pressure vs. time for an expansion tank that starts at operating pressure, is isolated from the system, drained down, and then fluidly filled to operating pressure, per a third embodiment of this invention

A third embodiment of a method of operation for pre-charge air pressure evaluation in an expansion tank commences with some unknown fluid volume contained within, and a means of continuously observing and recording pressure values in the fluid coupled to the tank. A graph of fluid pressure vs. time for this embodiment is illustrated in FIG. 5. In this embodiment, an expansion tank is isolated from the system, the contained fluid is drained to the atmosphere, and then the drain valve closed. Fluid pressure values are observed as fluid is introduced to fill the tank. When the fluid first pushes the diaphragm away from the tank inlet port, the pressure inflection point is identified with an associated observed time. At a pre-determined period of time subsequent to the time of the identified inflection point, the associated subsequent fluid pressure value is reported and utilized to evaluate the original pre-charge air pressure.

Definitions

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

In this description, "system" shall refer to the totality of the physical components and piping of a hydronic heat transfer system as is typically installed.

In this description, "controller" shall refer to the totality of the physical components, which receive system inputs, analyze said inputs, and respond with actions or signals as has been programmed or installed. Said controller can consist of, but is not limited to, any of a programmable logic controller, a dedicated microprocessor, analog to digital input-output device, mechanical or electromechanical timing devices, and associated power supplies, displays, switches, relays and indicator lights. Said controller can also incorporate any type of wired or wireless Internet connectivity, or wireless connectivity to any type of mobile device.

In this description, "expansion tank" or "tank" shall refer to a diaphragm-type or bladder-type expansion tank, as is typically installed in a closed loop heat transfer system, but shall not be limited in application to closed loop systems.

In this description, "valve", "isolation valve", "drain valve" or "fluid supply valve" shall refer to a positive closing valve that may be operated manually, or actuated by powered operation and controlled manually or by microprocessor or other programmed electronic device. The actuation force may be pneumatic, or electrical, either by motor actuator or solenoid actuator.

In this description, "sensor" or "transducer" or "pressure sensor" or "pressure transducer" may be used interchangeably and shall refer to a pressure sensing device, that may continuously output or periodically sample and output a signal proportional to the pressure exerted on the sensing port of the device; that signal may be electronically processed to yield a fluid pressure value.

In this description, "fluid" shall refer to the liquid contained in and or introduced to the system and or the expansion tank, which may be but is not limited to, water or a water-glycol mix. As used herein, "contained fluid" shall refer to fluid that is contained within the combination of a pressure transducer, a fluid supply valve, an expansion tank and the conduit coupling these components.

In this description, "air", "pre-charge air" or "charge air" shall refer to the compressed gas contained by the diaphragm to the dry side of a diaphragm-type expansion tank or between the bladder and the tank walls of a bladder-type expansion tank, and may be, but is not limited to, air and nitrogen gas.

The description refers frequently to the components commonly found in residential hydronic heating systems, but this should not be construed as limiting the application of this device to only such systems.

System Elements

A diaphragm or bladder type expansion tank 600.

A pressure transducer 610 fluidly coupled to the fluid content 654, 656 of the expansion tank 600.

A drain valve 616 fluidly coupled to the fluid content 654, 656 of the expansion tank 600.

A fluid supply valve 614 fluidly coupling a fluid supply source 652 for the system to the fluid content 654, 656 of the expansion tank 600.

Conduit 606 fluidly coupling the expansion tank 600, the pressure transducer 610, the fluid supply valve 614, and the drain valve 616.

An isolation valve 612 to collectively isolate the fluid content 654, 656 of the expansion tank 600 and the pressure transducer 610, fluid drain valve 616 and fluid supply valve 614 from the remainder of the hydronic system 650.

A valve or connection 618 on the air compartment of the expansion tank 600, able to both drain air from the tank 600 and allow air to be introduced to the tank 600.

A controller 640, including a timer, a means of periodically and or continuously measuring and displaying and or recording pressure values received from the pressure transducer 610, and configured to control the action of any or all connected power actuated valves. The controller 640 may embody a clock function, for the purpose of time stamping pressure data points. The controller 640 may be embodied in a local microprocessor or computer. The processing and control functions may be embodied all or in part by a connection to a mobile device 646, or by a modem connection 642 to a remote or cloud server 644.

Detailed Description of a First Embodiment of a Method of Use

Figure 6:
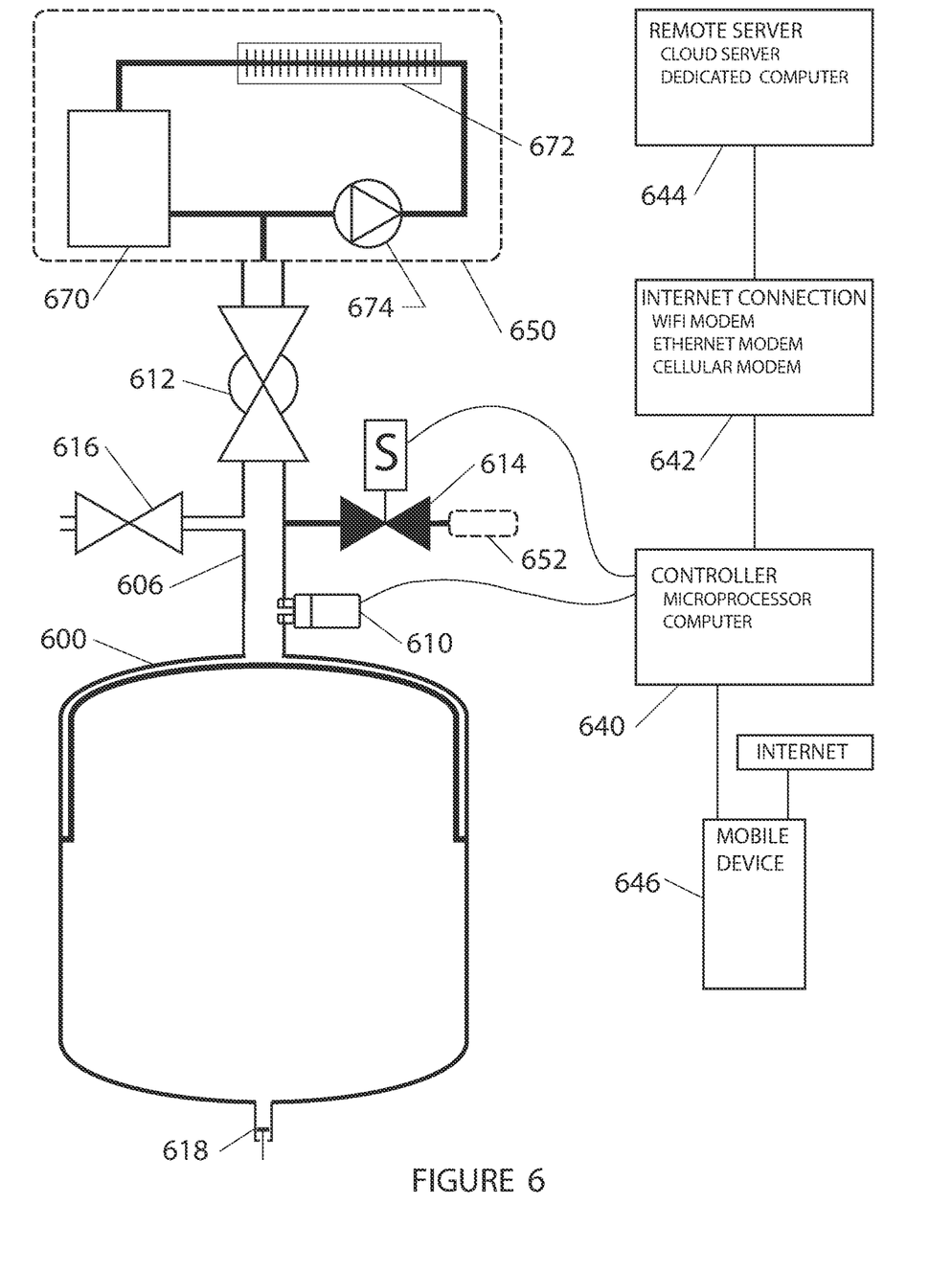
FIG. 6 is a schematic of a diaphragm type expansion tank fluidly coupled to a pressure transducer and with an arrangement of valves and connectivity to control devices, to enable a pre-charge air pressure test, per embodiments of this invention

This section describes a first embodiment of a method of operation for using a single pressure transducer coupled to the fluid content of an expansion tank, with an associated means of controlling a fluid supply valve and outputting and or recording fluid pressure data, configured to enable the evaluation of the pre-charge air pressure in the tank. FIG. 3 illustrates graphically the first embodiment of the method of operation. Reference is made to FIGS. 6, 7, 8, 9A and 9B, which illustrate the configuration of the expansion tank and pertinent elements of the system. In particular, FIG. 6 illustrates the relationship of the expansion tank 600 to the balance of the system 650. The system 650 may include one or more sources 670 of thermal energy, such as a boiler or heat pump, and one or more thermal energy emitters 672, such as baseboard radiators or in-floor radiant tubing. The system 650 may also include one or more pumps 674, to circulate the fluid between the source and emitter, thus effecting the transfer of thermal energy.

An expansion tank 600 may be fluidly filled, purged of trapped air and while at a stable fluid pressure (300), fluidly isolated from the system 650. A controller 640 may now initiate a pre-charge air pressure (330) evaluation test, by first preventing the opening of the fluid supply valve 614. The fluid drain valve 616 may then be opened (301) to the atmosphere. As fluid is evacuated, fluid pressure will fall (302), and when it reaches a stable residual value (340), the fluid drain valve 616 is then closed (304). In this state, the diaphragm is believed to be pushed tightly against the tank wall 602, and being functionally a rigid extension of the tank wall, supports but exerts no added air pressure on the fluid column 654 coupled to the pressure transducer 610. A pressure transducer 610 installed as shown will report the static fluid pressure associated with the fluid column height $H_1$ 660.

Figure 9A:
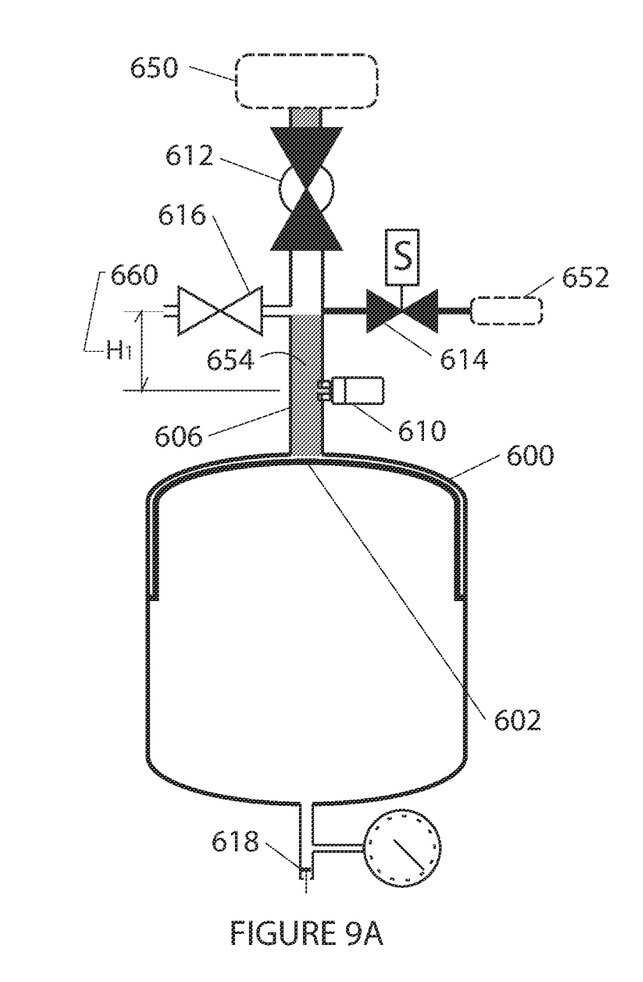
FIG. 9A illustrates the tank subsequent to the drain-down portion of the procedure of the first embodiment of this invention.
Figure 9B:
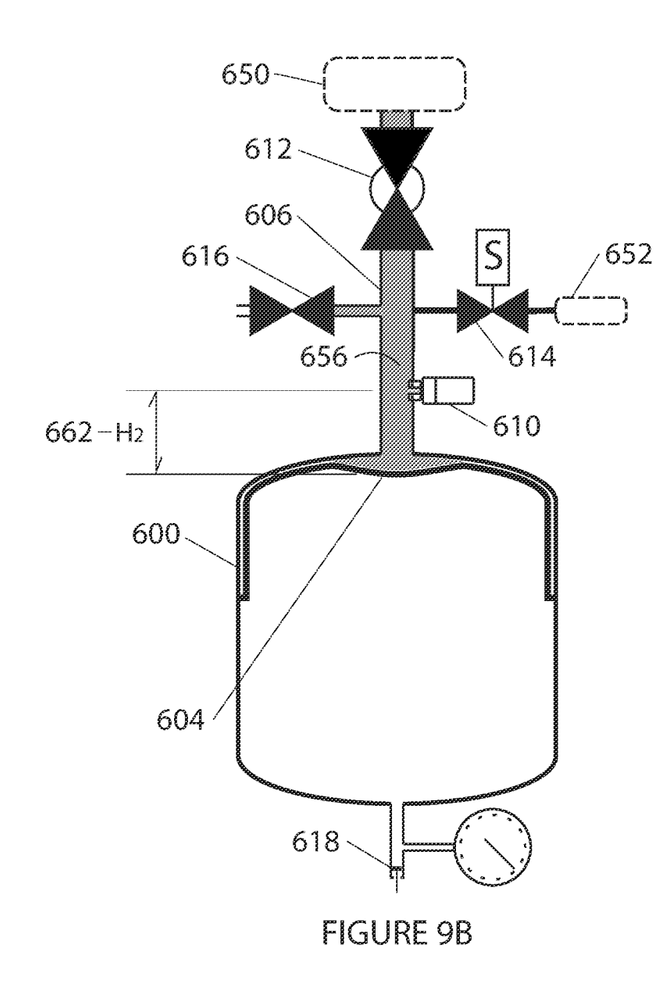
FIG. 9B illustrates the same tank subsequent to the pre-determined fluid fill operation of the first embodiment of this invention

The controller 640 may then open (305) the fluid supply valve 614 for a pre-determined first period of time T1 (310), also referred to as a pre-determined one period of time, to introduce a small pre-determined amount of fluid into the tank. Fluid pressure may transition nearly instantaneously (306) to the value of the tank pre-charge air pressure (330), and reach a greater pressure value (307) at the conclusion of the pre-determined first period of time T1 (310). As shown in FIG. 9B, the small pre-determined volume of fluid 656 may be sufficient to push the diaphragm or bladder 604 away from the fluid port of the tank, so as to eliminate the bridging of the membrane across the fluid port of the tank 600. The pre-charge air pressure on the opposite side of the diaphragm or bladder will now govern the pressure value reported in the fluid volume. The fluid pressure reported by the transducer 610 as shown will be the value of the current captive tank air pressure, as reduced by the static pressure value associated with the height of the fluid column $H_2$ 662.

At the conclusion of a pre-determined second period of time T2 (320), also referred to as a pre-determined other period of time, after the fluid supply valve 614 is closed, a pressure data point (314) may be sampled and reported. The offset in time may be selected to allow for transient fluid pressure values (313) to subside. The selected fluid pressure data point (314) may have a consistent, quantifiable maximum deviation (315) relative to the initial pre-charge air pressure (330).

The value of the current captive air pressure will be the pre-charge air pressure (330), as increased by the introduced fluid volume 604, which equally decreases the air volume. If upon evaluation, the pre-charge air pressure (330) is found to be outside of pre-determined bounds for operation of the system, air may be released to reduce the pre-charge pressure (330), or air added to increase the pre-charge pressure (330). The incompressible fluid volume within the tank remains constant, so that the periodic sampling of fluid pressure (314) will enable a real-time independent monitoring of the adjustment to air charge pressure. When the output from the pressure transducer 610 in the fluid 656 is observed to be within pre-determined bounds relative to a corresponding pre-determined air pre-charge pressure value (330), the test procedure may be terminated. The isolation valve 612 may now be opened and the system may be made operational.

In setting the duration of the first pre-determined period of time $T_1$ (310), it may be possible to regulate the added fluid volume to be just sufficient to reliably create the separation of the diaphragm from the tank wall 604. As a practical matter, a small orifice in the fluid supply valve 614 may substantially limit the rate of fluid input, and in operating over a pre-determined period of time (310), may reduce the effect of variation in fluid supply 652 pressure to an acceptable level of deviation in introduced fluid volume for the purposes of the test procedure. If the fluid supply 652 is drawn from a domestic water system in a building structure, it is likely that an installed pressure-regulating valve determines the domestic water supply pressure. In this situation, variation in the introduced fluid volume may be minimal, and the effect on the resultant air volume and therefore fluid pressure that is reported may be reduced to insignificant levels.

The predetermined first period of time $T_1$ (310) for the fill operation may also serve to regulate the potential deviation between the resultant static fluid pressure data point (314) and the initial air pre-charge pressure (330). Quantifying the period of time (310) for a fill operation, and thereby the introduced fluid volume, may effectively set bounds on the maximum observed deviation (315) in fluid pressure relative to a direct measurement of initial air pre-charge pressure (330).

An algorithm may incorporate compensation factors for the evaluation of the pre-charge air pressure, such as, but not limited to, the vertical difference $H_2$ 662 between the tank fluid port and the pressure transducer 610, or the incremental air pre-charge pressure deviation resulting from the reduction in air volume due to the volume of fluid introduced. As the pressure transducer 610 is in a fixed location in the fluid system, and is primarily to regulate system 650 operating fluid pressure, any or all of the possible compensation factors may not be necessarily required to obtain proper hydronic system operation.

The critical purposes of the embodiments of the invention are to establish that the pre-charge air pressure is within a pre-determined range less than the intended lowest system fluid operating pressure, and to evaluate this pressure value in a manner that can be both reliably and consistently repeatable even over passage of long spans of time. In the first embodiment of this invention, dynamic pressure factors are reduced or eliminated as variables that may need to be corrected for by an algorithm. Additionally, the pre-charge air pressure may be adjusted in response to the indirectly coupled and periodically sampled fluid pressure.

Figure 7:
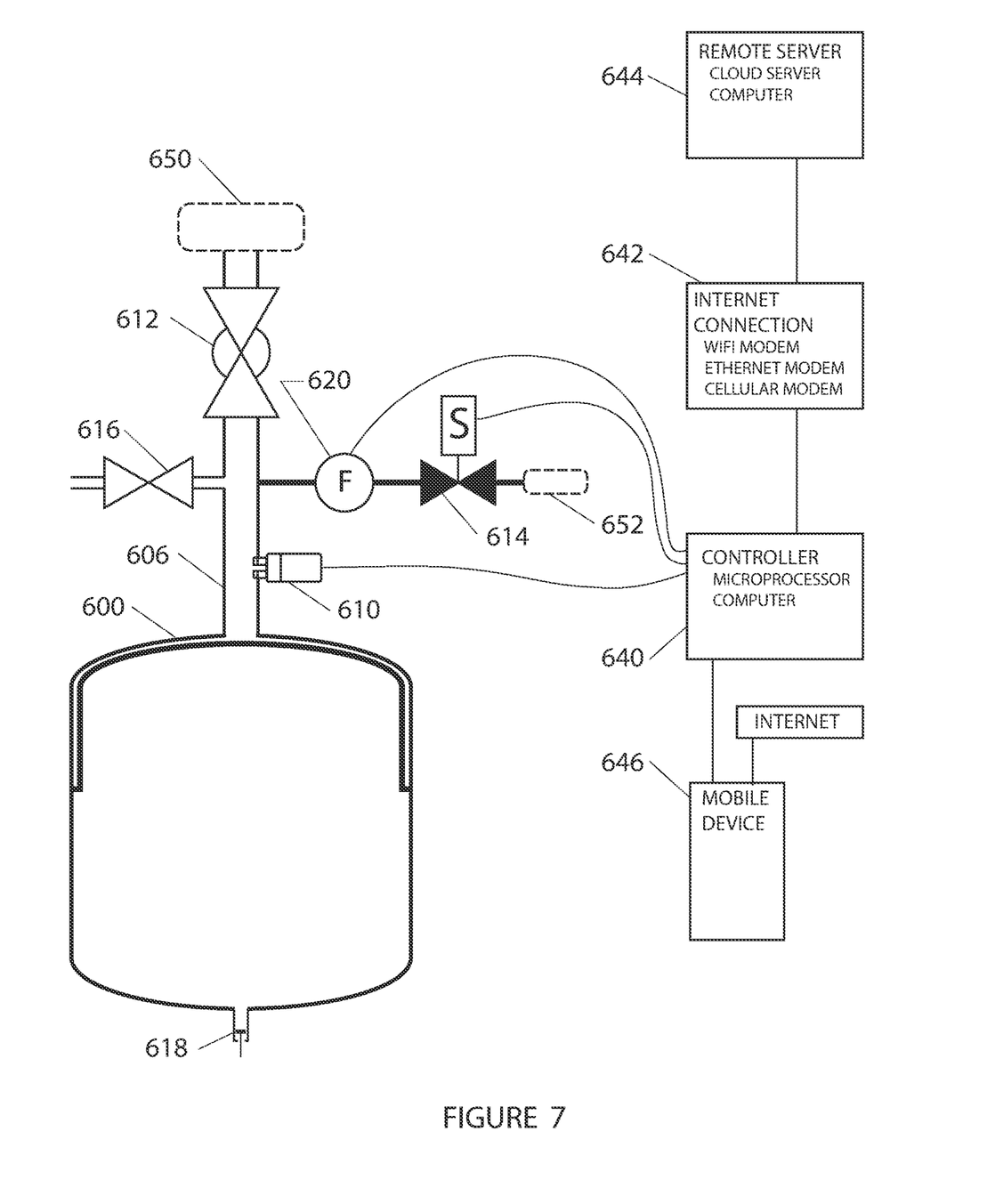
FIG. 7 is a schematic of a diaphragm type expansion tank fluidly coupled to a pressure transducer, a flow meter on the fluid supply, and with an arrangement of valves and connectivity to control devices, to enable a pre-charge air pressure test, per embodiments of this invention

A second variation of the first embodiment of this method may rely on an indeterminate first period of time $T_1$ (310) during which the fluid supply valve 614 is open. The controller 640 may close the fluid supply valve 614 and terminate the first period of time $T_1$ (310) responsive to input from a fluid flow meter 620 reporting the volume of fluid passing through the fluid supply valve 614 into the tank 600. An arrangement of valves with a fluid flow meter and the connectivity to enable this variation is illustrated in FIG. 7.

A third variation of the first embodiment of this method may rely on sampling and reporting two pressure data points (314). At the conclusion of a pre-determined second period of time $T_2$ (320) after the fluid supply valve 614 is closed, a pressure data point (314) may be sampled and reported. Thereafter, at the conclusion of a pre-determined interval of time subsequent to the conclusion of the pre-determined second period of time $T_2$ (320), a second pressure data point may be sampled and reported. One of the data points (314) may be selectively relied on, or the two data points may be averaged, or an algorithm may compare the two data points as a check process for the validity of the reported results.

A fourth variation of the first embodiment of this method may be by a graph of pressure vs. time generated by a local microprocessor 640 or electronic device 646, or by a remote server 644. The resultant static pressure value may then be evaluated visually or determined by the mechanic or installer. The observed deviation between the pressure inflection point and the final static fluid pressure value (314) may be recorded and or utilized.

A fifth variation of the first embodiment of this method may be by a mechanic or installer visually observing the pressure data displayed in real time, or as data recorded and subsequently examined, and thereby evaluating the final fluid pressure value (314).

Figure 8:
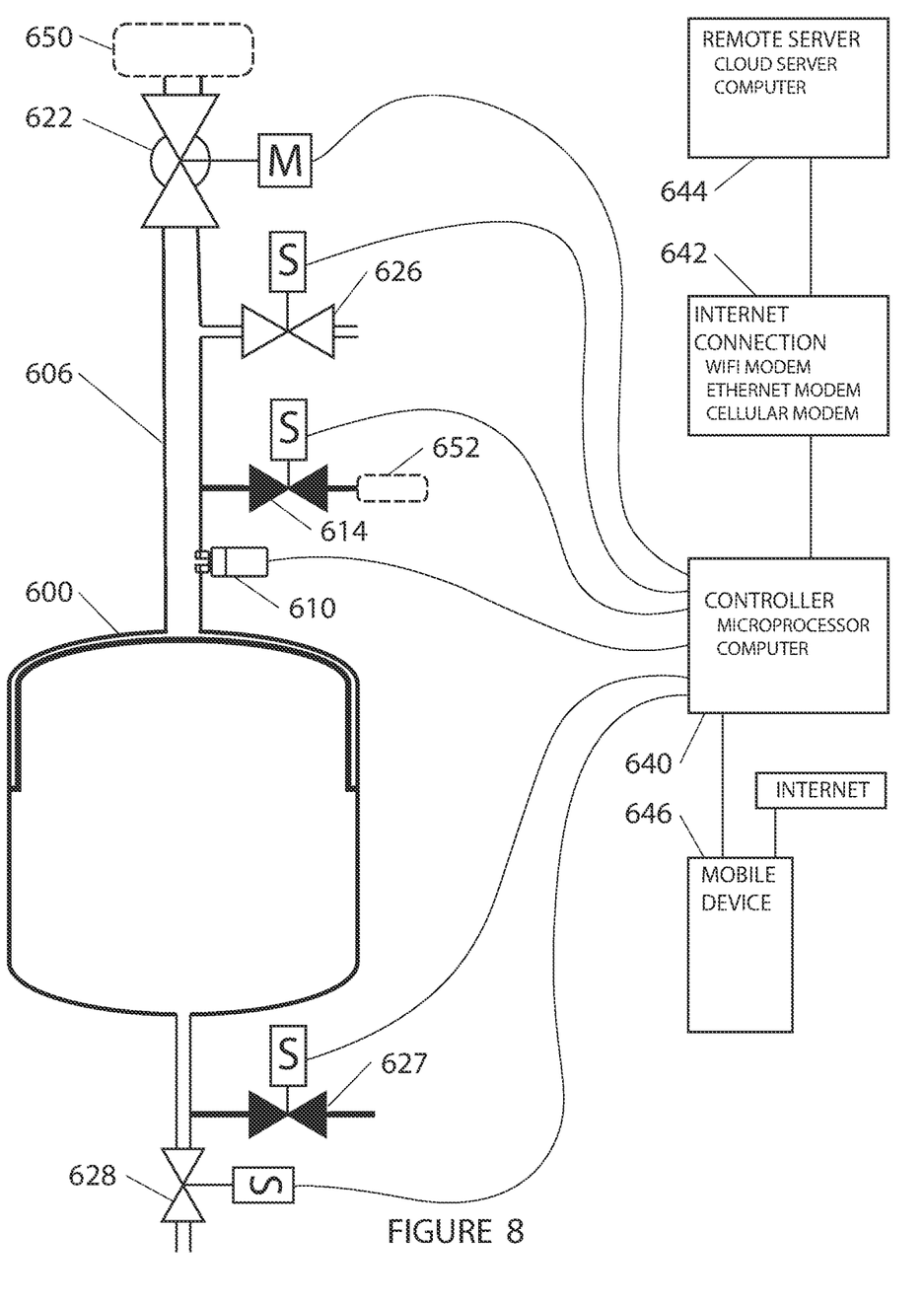
FIG. 8 is a schematic of a diaphragm type expansion tank fluidly coupled to a pressure transducer and with an arrangement of valves and connectivity to control devices, to enable a fully automated pre-charge air pressure test, per embodiments of this invention

A sixth variation of the first embodiment of this method may incorporate power actuation of the isolation valve 622, the fluid supply valve 614 and the fluid drain valve 626. Operation of these valves may be collectively controlled by a software application, thereby automating any or all of the test procedure. This variation may include a power actuated air drain valve 628 and a power actuated air fill valve 627 for the pre-charge air, and may also embody an automated setting or adjustment of the pre-charge air pressure to a prescribed value. The derived pre-charge air pressure value (314) may be displayed and or recorded automatically. An arrangement of valves and connectivity to enable this variation is illustrated in FIG. 8.

Detailed Description of a Second Embodiment of a Method of Use

This section describes a second embodiment of a method of operation for using a single pressure transducer coupled to the fluid contents of an expansion tank, with an associated means of recording time stamped pressure data, to evaluate the pre-charge air pressure in the tank. FIG. 4 illustrates graphically the second embodiment of the method of operation. Reference is made to FIGS. 6 and 8, which illustrate the configuration of the expansion tank and pertinent elements of the system.

An expansion tank 600 may be fluidly filled and purged of trapped air, and while at a stable fluid pressure (400), an isolation valve 612 may then be closed. While periodically sampling fluid pressure at regular intervals, a controller 640 may now initiate a pre-charge air pressure evaluation test, by first preventing the opening of the fluid supply valve 614. The drain valve 616 may be opened (401) and fluid may be evacuated from the tank 600, down to a residual static pressure value (440). Draining the tank will first result in a gradual drop in fluid pressure (402), followed by a precipitous drop (404) in fluid pressure at the instant (403) the last fluid is pushed out from between the tank wall and the diaphragm or bladder. The fluid pressure value observed at an inflection point (403) will correlate to the pre-charge air pressure (430).

Dynamic fluid pressure effects and a fluid pressure sampling rate that may be employed may make it difficult to identify the exact pressure inflection point (403) and the associated instantaneous static fluid pressure value, and by extension the corresponding static pre-charge air pressure value (430) existing in the tank. It is not required to report the associated pressure value (403). In this method the fluid pressure inflection point (403) is identified in time within a predetermined total time uncertainty $T_3$ (410). The method selects a stored pressure data point (405) at a pre-determined period of time $T_4$ (420) prior to the inflection point (403), the period of time being greater than the total uncertainty in time $T_3$ (410) used to identify the inflection point (403).

This second embodiment of a method of operation employs the offset in time $T_4$ (420) to constrain the selection of the pressure data point (405) within a bounded period of time (407) within the period of relatively slow and approximately linear change of fluid pressure (402) that occurs while the tank still contains some fluid volume. The retroactive period of time $T_4$ (420) for the selection of a prior pressure value data point (405) is pre-determined to be greater than the possible time span $T_3$ (410) of the pressure collapse (404) that is coincident with the final volume of fluid being evacuated by the action of the diaphragm. The duration of the period of time $T_4$ (420) selected for the offset in time may also be utilized to constrain the maximum deviation (406) of the reported fluid pressure value from the actual pre-charge air pressure (430). A longer retroactive period of time $T_4$ (420) will result in the data selection point (405) being coincident with a larger fluid volume still in the tank, and a correspondingly larger deviation (406) in fluid pressure relative to the actual initial pre-charge air pressure (430). A shorter period of time $T_4$ (420) will likewise result in less deviation (406) between the reported pressure value (405) and the air pre-charge pressure value (430). Too short a period of time may place the selected data point (405) within the period of uncertainty $T_3$ (410), or dynamically unstable fluid pressure values (404).

As a requirement for a valid test result, an algorithm may place bounds on the rate of observed pressure loss while draining the tank. An algorithm may incorporate compensation factors, such as, but not limited to, the vertical difference between the tank fluid port and the pressure transducer, dynamic pressure effects due to fluid flow, or the incremental pressure deviation resulting from reporting a pressure value prior to complete fluid evacuation. In practice, however, these factors may be too small to be of consequence. As the pressure transducer is in a fixed location in the fluid system, and is primarily to regulate system fluid pressure, compensations may not be necessarily required for proper system operation.

The critical purposes of the embodiments of the invention are to establish that the pre-charge air pressure is within a pre-determined range less than the intended lowest system operating pressure, and to measure this value in a manner that can be both reliably and consistently repeatable even over long elapsed time spans.

A second variation of the second embodiment of this method of operation may rely on sampling and reporting two pressure data points. A first stored pressure data point (405), corresponding to a pre-determined period of time $T_4$ (420) prior to the identified inflection point (403), may be reported. A second pressure data point, corresponding to a pre-determined interval of time prior to the first pressure data point, may be reported. One of the data points (405) may be selectively relied on, or the two data points may be averaged, or an algorithm may compare the two data points as a check process for the validity of reported results.

A third variation of the second embodiment of this method of operation may use an algorithm to evaluate the initial rate of fluid pressure change (402), that may then be used to constrain that rate of change as a condition for obtaining a valid test result.

A fourth variation of the second embodiment of this method of operation may be by a graph of pressure vs. time generated by a local microprocessor or electronic device, or by a remote server. The pressure value (403) from which the rate of pressure change increases sharply may then be evaluated visually or be determined by the mechanic or installer.

A fifth variation of the second embodiment of this method of operation may be by a mechanic or installer visually observing the pressure data in real time, or as data recorded and subsequently examined, and thereby evaluating the pressure value at the inflection point (403) of pressure fall-off.

Detailed Description of a Third Embodiment of a Method of Use

This section describes a third embodiment of a method of operation for using a single pressure transducer coupled to the fluid contents of an expansion tank, with an associated means of recording pressure data, to evaluate the pre-charge air pressure in the tank. FIG. 5 illustrates graphically the third embodiment of the method of operation. Reference is made to FIGS. 6, 8 and 9A, which illustrate the configuration of the expansion tank and pertinent elements of the system.

An expansion tank 600 may be fluidly filled, purged of trapped air and while at a stable fluid pressure (500), an isolation valve 612 may then be closed. While periodically sampling fluid pressure at regular intervals, a controller 640 may now initiate a pre-charge air pressure (530) evaluation test, by first preventing the opening of the fluid supply valve 614. A fluid drain valve 616 may then be opened (501) and fluid may be evacuated from the tank 600. When the fluid pressure (502) reaches a stable residual value (540), the fluid drain valve 616 is then closed (504). In this state, the diaphragm is believed to be pushed tightly against the tank wall 602 and is functionally a rigid extension of the tank wall, and therefore supports but exerts no added air pressure on the fluid column (654) coupled to the pressure transducer 610. A pressure transducer 610 installed as shown will report the static fluid pressure associated with the fluid column height $H_1$ 660.

The controller 640 may then open (505) the fluid supply valve 614. At the instant (506) the fluid pushes the diaphragm or bladder away from the fluid port in the tank, there may be observed a precipitous increase (507) in fluid pressure. Going forward, the pre-charge air pressure (530) on the diaphragm or bladder will govern the fluid pressure measurement on the opposite side of the diaphragm or bladder. The fluid pressure value observed immediately at the end of the precipitous rise (507), at an inflection point (508) at which the rate of fluid pressure increase (509) proceeds much more slowly, will correlate to the pre-charge air pressure (530).

It is not required to identify the inflection point (508) with absolute precision in time, or to report the associated pressure value. In this third embodiment of a method of operation, the fluid pressure inflection point (508) is identified in time within a predetermined total range of uncertainty $T_5$ (510). The controller 640 may select a pressure data point (525) at a pre-determined period of time $T_6$ (520) subsequent to the identified inflection point (508), the period of time $T_6$ (520) being greater than the total uncertainty $T_5$ (510) in identifying the inflection point (508). This offset in time places the range for the selection (526) of the pressure data point (525) in the period of relatively slow and approximately linear change of fluid pressure (509) that occurs while continuing to fluidly fill the tank.

The period of time $T_6$ (520) selected for the offset may also be utilized to constrain the maximum deviation (527) of the reported pressure value (525) from the actual pre-charge air pressure (530). A longer subsequent period of time $T_6$ (520) will result in the data selection point (525) being coincident with a larger fluid volume 656 introduced to the tank 600, and a correspondingly larger deviation (527) in fluid pressure relative to the actual initial pre-charge air pressure (530). A shorter period of time $T_6$ (520) will likewise result in less deviation (527) between the reported pressure value (525) and the pre-charge air pressure value (530).

An algorithm may incorporate compensation factors, such as, but not limited to, the vertical difference 662 between the tank fluid port and the pressure transducer 610, dynamic pressure effects due to fluid flow, or the incremental pressure deviation resulting from reporting a value subsequent to the inflection point. As the pressure transducer 610 is in a fixed location in the fluid system, and is primarily to regulate system fluid pressure, compensations may not necessarily be required for proper system operation.

A second variation of the third embodiment of this method may rely on sampling and reporting two pressure data points (525). A first pressure data point (525), at a pre-determined period of time $T_6$ (520) subsequent to the identified inflection point (508), may be reported. A second pressure data point, corresponding to a pre-determined interval of time subsequent to the first pressure data point, may be reported. One of the data points may be selectively relied on, or the two data points may be averaged, or an algorithm may compare the two data points as a check process for the validity of reported results.

A third variation of the third embodiment of this method may be by a graph of pressure vs. time generated by a local microprocessor 640 or electronic device 646, or by a remote server 644. The pressure value (508) from which the rate of pressure change decreases sharply may then be evaluated or determined visually by the mechanic or installer.

A fourth variation of the third embodiment of this method may be by a mechanic or installer visually observing the pressure data in real time, or as data recorded and subsequently examined, and thereby evaluating the pressure-time upper inflection point (508).

Applications of the Method of Use
   I. The test procedure may be used to set up and or verify the pre-charge air pressure in an expansion tank at the time of system installation and or startup. This may enable the installer to closely match the pre-charge air pressure to the intended fluid operating pressure, and thereby optimize the acceptance volume of the expansion tank.
   II. The test procedure may be used as a part of regular system maintenance, and the values recorded manually, or stored electronically. Comparison to previous values may identify a slow loss of pre-charge air pressure.
   III. The test procedure may be used as a diagnostic tool at any time, such as in the case of observing an atypical increase in system fluid operating pressure, which may be the result of a loss of pre-charge air pressure from any cause.
   IV. In critical system applications, a fully automated pre-charge air pressure test and adjustment procedure may be incorporated, and may be a regularly and automatically scheduled event.
   V. The test procedure may be utilized in any type of system that embodies a diaphragm or bladder type expansion tank, in which the expansion tank and an associated fluidly coupled pressure transducer may be collectively fluidly isolated from the balance of the system.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A method for the evaluation of pre-charge air pressure in a diaphragm-type or bladder-type expansion tank in a hydronic system, the method comprising:
   providing the hydronic system, the hydronic system including (a) the diaphragm-type or bladder-type expansion tank, the expansion tank being pre-charged with pressurized gas, (b) a pressure transducer, (c) a fluid supply valve fluidly coupled to a fluid supply, (d) conduit fluidly coupling the expansion tank, the pressure transducer, and the fluid supply valve, (e) a contained fluid contained in a system combination of the pressure transducer, the fluid supply valve, the conduit and the expansion tank, (f) an isolation valve configured to fluidly isolate the system combination from a remainder of the hydronic system, (g) a drain valve configured to allow draining of the contained fluid, (h) a controller, the controller including a timer and being configured to control operations of the fluid supply valve and to record or report pressure data as indicated by the pressure transducer, and (i) the remainder of the hydronic system including at least a heating source, a circulator pump, and one or more emitters;
   initiating a pre-charge air pressure evaluation test, the pre-charge air pressure evaluation test performing in order,
      (1) closing the isolation valve to collectively fluidly isolate the contained fluid from the remainder of the hydronic system,
      (2) opening the drain valve, causing an evacuation of the contained fluid from within the expansion tank,
      (3) closing the drain valve,
      (4) opening the fluid supply valve, causing additional fluid to flow into the system combination,
      (5) closing the fluid supply valve when a pre-determined amount of additional fluid has been added to the system combination,
      (6) starting a timer coincident with the closing of the fluid supply valve, to count a pre-determined one period of time, and
      (7) measuring and reporting the pressure value of a fluid combination of (i) remaining fluid of the contained fluid, and (ii) the additional fluid at a conclusion of the pre-determined one period of time.

2. The method of claim 1, wherein said closing the fluid supply valve, further comprises closing the fluid supply valve at the conclusion of a pre-determined other period of time, coincident with said starting a timer to count a pre-determined one period of time.

3. The method of claim 1, wherein said closing the fluid supply valve, further comprises measuring a volume of the predetermined amount of additional fluid passing through the fluid supply valve.

4. The method of claim 1, in which control of the fluid supply valve and said reporting the pressure value may be by any electronic means, including, but not limited to, a locally installed microprocessor, a connected computer, a connected mobile device, or by connected software operating remotely from the cloud.

5. The method of claim 1, further comprising storing in electronic form, either locally or remotely, the pressure value.

6. The method of claim 1, wherein in said measuring and reporting the pressure value, further comprises additionally measuring and reporting an additional pressure value of the combination of the contained fluid and the additional fluid at a conclusion of a pre-determined interval of time that began to run immediately after the conclusion of the pre-determined one period of time.

7. The method of claim 1, wherein operation of the isolation valve, the fluid supply valve and or the drain valve is powered and under automatic control.

8. A method for the evaluation of pre-charge air pressure in a diaphragm-type or bladder-type expansion tank in a hydronic system, the method comprising:
   providing the hydronic system, the hydronic system including (a) a diaphragm-type or bladder-type expansion tank, the expansion tank being pre-charged with pressurized gas, (b) a pressure transducer, (c) a fluid supply valve fluidly coupled to a fluid supply, (d) conduit fluidly coupling the expansion tank, the pressure transducer, and the fluid supply valve, (e) a contained fluid contained in a system combination of the pressure transducer, the fluid supply valve, the conduit and the expansion tank, (f) an isolation valve configured to fluidly isolate the combination of the pressure transducer, the fluid supply valve, the expansion tank, the conduit and the contained fluid from a remainder of the hydronic system, (g) a drain valve configured to allow draining of the contained fluid, (h) a controller, the controller including a timer and being configured to control operations of the fluid supply valve and to record or report pressure data with a time stamp as indicated by the pressure transducer, and (i) the remainder of the hydronic system including at least a heating source, a circulator pump, and one or more emitters;

periodically sampling and recording fluid pressure values at regular intervals;

initiating a pre-charge air pressure evaluation test, the pre-charge air pressure evaluation test performing in order,
- (1) closing the isolation valve to collectively fluidly isolate the contained fluid from the remainder of the hydronic system,
- (2) opening the drain valve, causing an evacuation of the contained fluid from within the expansion tank,
- (3) observing a rate of change of fluid pressure values of the contained fluid as the contained fluid is evacuated from the expansion tank,
- (4) identifying a first inflection point in the rate of change of fluid pressure values,
- (5) reporting a first previously recorded fluid pressure value associated with a first point in time preceding the identified first inflection point, the point in time being at a pre-determined period of time prior to the identified first inflection point.

9. The method of claim 8, wherein in said reporting a first previously recorded fluid pressure value further comprises reporting a second previously recorded fluid pressure value associated with a second point in time at a pre-determined interval of time prior to the first point in time.

10. The method of claim 8, further comprising evaluating the rate of change of fluid pressure values.

11. The method of claim 10 further comprising determining whether the rate of change of fluid pressure values is within acceptable bounds for obtaining a valid test result.

12. The method of claim 8, further comprising generating a graphical output of pressure versus time.

13. A method for the evaluation of pre-charge air pressure in a diaphragm-type or bladder-type expansion tank in a hydronic system, the method comprising:

providing the hydronic system, the hydronic system including (a) the diaphragm-type or bladder-type expansion tank, the expansion tank being pre-charged with pressurized gas, (b) a pressure transducer, (c) a fluid supply valve fluidly coupled to a fluid supply, (d) conduit fluidly coupling the expansion tank, the pressure transducer, and the fluid supply valve, (e) a contained fluid contained in a system combination of the pressure transducer, the fluid supply valve, the conduit and the expansion tank, (f) an isolation valve configured to fluidly isolate the combination of the pressure transducer, the fluid supply valve, the expansion tank, the conduit and the contained fluid from a remainder of the hydronic system, (g) a drain valve configured to allow draining of the contained fluid, (h) a controller, the controller including a timer and being configured to control operations of the fluid supply valve and to record or report pressure data as indicated by the pressure transducer, and (i) the remainder of the hydronic system including at least a heating source, a circulator pump, and one or more emitters;

periodically sampling and recording fluid pressure values at regular intervals;

initiating a pre-charge air pressure evaluation test, the pre-charge air pressure evaluation test performing in order,
- (1) closing the isolation valve to collectively fluidly isolate the contained fluid from the remainder of the hydronic system,
- (2) opening the drain valve, causing an evacuation of the contained fluid from within the expansion tank,
- (3) closing the fluid drain valve,
- (4) opening the fluid supply valve causing the flow of additional fluid into the system combination,
- (5) observing a rate of change of fluid pressure values within the system combination as additional fluid flows into the system combination,
- (6) identifying a first inflection point in the rate of change of fluid pressure values,
- (7) starting a timer counting from the inflection point, to count a pre-determined period of time, and
- (8) at a conclusion of the pre-determined period of time, reporting an associated fluid pressure value.

14. The method of claim 13, wherein in said reporting an associated fluid pressure value, further comprises at a conclusion of a pre-determined interval of time running immediately following the pre-determined period of time, reporting a second associated fluid pressure value.

15. The method of claim 13, further comprising the generation of a graphical output of pressure versus time.

* * * * *